US006558642B2

(12) United States Patent
El-Shoubary et al.

(10) Patent No.: US 6,558,642 B2
(45) Date of Patent: *May 6, 2003

(54) METHOD OF ADSORBING METALS AND ORGANIC COMPOUNDS FROM VAPOROUS STREAMS (75) Inventors: Youssef El-Shoubary, North Brunswick, NJ (US); Rudy Maes, Easton, PA (US)

(73) Assignee: Merck & Co., Inc., Rahway, NJ (US)

( * ) Notice: Subject to any disclaimer, the term of this patent is extended or adjusted under 35 U.S.C. 154(b) by 45 days.

This patent is subject to a terminal disclaimer.

(21) Appl. No.: 09/820,479

(22) Filed: Mar. 29, 2001

(65) Prior Publication Data

US 2002/0198097 A1 Dec. 26, 2002

(51) Int. Cl.[7] .............................. B01D 53/02; B01J 8/00
(52) U.S. Cl. ...................... 423/245.3; 95/133; 95/134; 95/141; 95/142; 95/900; 423/240 S
(58) Field of Search ...................... 95/133, 134, 141, 95/142, 900; 423/210, 240 R, 240 S, 245.1, 245.3, 215.5

(56) References Cited

U.S. PATENT DOCUMENTS

| | | | | |
|---|---|---|---|---|
| 1,984,164 A | * | 12/1934 | Stock ........................ 423/210 |
| 3,193,987 A | * | 7/1965 | Manes et al. ................ 423/210 |
| 3,194,629 A | * | 7/1965 | Dreibelbis et al. .......... 423/210 |
| 3,786,619 A | * | 1/1974 | Melkersson et al. ........... 55/72 |
| 3,956,458 A | * | 5/1976 | Anderson .................... 423/210 |
| 4,094,777 A | * | 6/1978 | Sugier et al. ................. 210/32 |
| 4,273,747 A | * | 6/1981 | Rasmussen ................. 423/210 |
| 5,409,522 A | * | 4/1995 | Durham et al. ............... 75/670 |
| 5,507,238 A | * | 4/1996 | Knowles ..................... 110/245 |
| 5,569,436 A | * | 10/1996 | Lerner ........................ 422/170 |
| 5,607,496 A | * | 3/1997 | Brooks ........................ 75/670 |
| 5,827,352 A | * | 10/1998 | Altman et al. ................. 95/58 |

* cited by examiner

Primary Examiner—Stanley S. Silverman
Assistant Examiner—Maribel Medina
(74) Attorney, Agent, or Firm—James M. Hunter, Jr.; Mark R. Daniel (57) ABSTRACT A method and adsorption powder useful for the removal of mercury and other metals, as well as furans, dioxins and other organic compounds from high temperature and high moisture gaseous streams. The method utilizes an adsorption powder characterized as containing a carbon-based powder and an effective amount of cupric chloride suitable to remove metals and organic compounds. The powder may contain calcium hydroxide, sulfur, potassium permanganate, potassium iodide, and combinations thereof.

28 Claims, 1 Drawing Sheet

METHOD OF ADSORBING METALS AND ORGANIC COMPOUNDS FROM VAPOROUS STREAMS

BACKGROUND OF THE INVENTION

Strict standards exist for particulate and total mercury emissions by coal-fired power plants, petroleum and chemical refineries, coal-fired furnaces, trash burning facilities, incinerators, metallurgical operations, thermal treatment units and other particulate and mercury emitting facilities. These same restrictions apply to mercury vapor, which can enter the atmosphere as a result of low temperature thermal desorption (LTTD) treatment of contaminated soils.

These emission standards exist in order to protect the environment from harmful pollutants. When mercury-containing gases are emitted to the atmosphere, they disperse over a wide area and mercury can be deposited thereby. The dispersed mercury can accumulate in the soil and water supplies, where it can be incorporated into the food chain.

Mercury is extremely harmful to aquatic life and ultimately to the humans who consume mercury-contaminated plants and animals. It is necessary, therefore, to have a safe and effective method of eliminating mercury from the environment.

The problem with capture and treatment of mercury vapor, typically in the context of coal-fired power plants and waste incinerators, has been considered. U.S. Pat. No. 3,193,987 discloses a method of passing mercury-containing vapor over activated carbon impregnated with a metal that forms an amalgam with mercury. U.S. Pat. No. 4,094,777 discloses a method of passing a mercury-containing vapor over an adsorption mass consisting essentially of a support, sulfide copper and sulfide silver. U.S. Pat. No. 3,876,393 discloses a method of passing mercury-containing vapors over activated carbon that has been impregnated with sulfuric acid.

U.S. Pat. No. 3,786,619 discloses a method of passing a mercury-containing gas over a mass containing as an active component, selenium, selenium sulfide or other selenium compounds. Electrostatic precipitators and various filters have traditionally been used for mercury removal, although other apparati have also been disclosed (see e.g., U.S. Pat. Nos. 5,409,522 and 5,607,496).

The problem of recapturing mercury from power plant gaseous streams is analogous to the need for recapturing mercury from incinerators that treat contaminated soils. A method currently in use at soil treatment facilities is known as low temperature thermal desorption (LTTD). LTTD is the main method by which contaminated soils are treated to remove mercury, other metals, and organic contaminants. In this method, contaminated soils are fed into a heating furnace, most commonly a rotary kiln/drum, where the soil is heated by conduction. The heating volatizes the soil components and when a thermal oxidizer is added, the components are oxidized to manageable gases, such as $CO_2$, $Cl_2$, $NO_x$ and $SO_x$, where x is 1–3. The hot gas stream is subsequently cooled. The stream may be quenched with water, which cools the stream and concurrently increases the moisture content. Although water quenching is a highly effective cooling method, this treatment increases the difficulty of removing mercury from the gaseous stream. The gaseous stream is further treated to reduce and remove metals, HCl, $NO_x$ and $SO_x$ using acid scrubbers, carbon beds, condensation units, and the addition of adsorption powders thereto.

When adsorption powders are injected into the gaseous stream, mercury and other metals react to form capturable compounds in the powder; precipitating them from the gaseous stream. The powder-bound mercury is ultimately collected in a bag house for appropriate disposal, while the clean gaseous stream is exhausted to the outside atmosphere. The problem with standard LTTD methods is that some metals, such as mercury, are not efficiently removed from vaporous streams with current technology and will be emitted with the effluent gaseous stream into the environment. Other methods require the use of complex machinery and expensive adsorption beds. LTTD and other methods also suffer from the limitation that mercury removal from high moisture gaseous streams is much more difficult than mercury removal from dry streams.

Available adsorption powders can remove organic compounds, metals, and other contaminants, but they do not effectively remove mercury. For example, one available powder, Sorbalite™, consisting of carbon, calcium hydroxide and sulfur effectively removes HCl from a gaseous stream, but its efficiency of removal is only about 55 to about 65 percent. Another powder, WUELFRAsorb-C™, consisting of alcohol-saturated lime and activated carbon is also inefficient at removing mercury.

Adsorption powders containing sulfur or iodine impregnated on a carbon substrate, at temperatures of about 75° C. or less, showed about 95 percent mercury removal efficiency. However, adsorption powders formulated with sulfur impregnated onto a carbon substrate require gaseous streams to be dry for efficient mercury removal.

Mercury removal efficiency of the adsorption powders described above as well as other available carbon-based powders is known to be temperature dependent. Accordingly, there is a need for an adsorption powder that effectively removes metals and organic compounds from gaseous streams generated by industrial methods and other mercury liberating sources.

SUMMARY OF THE INVENTION

The present invention is directed to a novel, carbon-based, adsorption powder, characterized as containing an effective amount of cupric chloride, suitable for removing metals and organic compounds from gaseous streams. The powder, in various embodiments, is further characterized as containing calcium hydroxide, sulfur, potassium permanganate, potassium iodide, and combinations thereof, along with the carbon-based powder and the effective amount of cupric chloride. The invention is further directed to a method of removing metals, e.g. mercury, and organic compounds from a gaseous stream using the adsorption powder described above, wherein the method is characterized by the steps of:

a) placing a solid phase metals- and organic compounds-containing material into a cleaner;

b) heating the cleaner containing the solid phase material to form gaseous and solid components of the material, wherein the metals are vaporized and contained in the gaseous component and the organic compound are reduced to elemental gases;

c) transferring the gaseous component to an exhaust cleaning unit/afterburner, and transferring the solid component to a cooling unit;

d) heating the exhaust cleaning unit/afterburner containing the gaseous component to combust the organic compounds to elemental oxides;

e) cooling the exhaust cleaning unit/afterburner containing the gaseous component;

f) adding the adsorption powder to the exhaust cleaning unit/afterburner to adsorb the metal;

g) transferring the powder-containing gaseous component to a baghouse; and h) releasing the substantially metal-free gaseous component of said sample to the atmosphere,
wherein the metals are selected from the group consisting of mercury, lead, nickel, zinc, copper, arsenic and cadmium, and the organic compounds are selected from the group consisting of dioxins and furans.

DETAILED DESCRIPTION OF THE INVENTION

The term "carbon-based powder" is generally defined as any powder, whether dry or in a slurry form, that contains an effective amount of carbon suitable for adsorbing selected materials from vaporous streams. Typical carbon-based powders may include, but are not limited to, coal carbons, fruit pits, wood carbon, graphite carbon, activated carbon, coconut shell carbon, peat carbons, petroleum cokes, synthetic polymers, and combinations thereof. The coal carbons may be prepared from lignite, bituminous, sub-bituminous, and anthracite coal carbons, and combinations thereof. While other components, mentioned herein below, when added to the carbon-based powder may aid in the efficient removal of metal and organic components from vaporous streams, it has been observed that the carbon-based powder in conjunction with an effective amount of cupric chloride will efficiently adsorb the named components.

The term "high temperature" as used herein is that temperature required to provide the amount of heat necessary to vaporize a metal sought to be removed from the gaseous component of the method of the invention, i.e. a temperature from about 325° to about 900° F. The term "high moisture" as used herein is defined as an amount of water content of from about 21 weight percent $H_2O$ up to the saturation point for any operative temperature.

The invention is directed to an adsorption powder for removing organic compounds and metals, e.g., mercury, zinc, copper, lead, nickel, cadmium and arsenic, from a gaseous stream, wherein the powder may be characterized as containing a carbon-based powder, and an effective amount of cupric chloride. The metals must be at a high temperature (e.g. in the vaporous state) and generally associated with high moisture.

The carbon-based powder may also contain amounts of several components know for increasing adsorption efficiency, including one or more components selected from calcium hydroxide, sulfur, potassium permanganate, potassium iodide. Generally, these components may be present in the carbon-based powder in amounts of from about 2 to about 60 weight percent, based on the total weight of the carbon-based powder.

The phrase "effective amount of cupric chloride" is generally defined as an amount of cupric chloride from about 1 to about 45 weight percent, based on a total of 100 percent weight percent. Dependent upon the operating conditions of the LTTD process, and the state of the powder, i.e. dry or slurry preparations, the effective amount of cupric chloride for efficiently adsorbing metals and organic compounds will vary. The copper component of the cupric chloride may exhibit a valence of +2, +3 or +4, i.e. cupric(II)chloride, cupric(III)chloride or cupric(IV)chloride, respectively. The cupric chloride compositions of the invention may be utilized in a powder- or liquid- (e.g. slurry) form. The powder- or liquid-form requires that the material by granulated to the requirements described herein below. Afterwards the cupric chloride may admixed with the powder composition or impregnated onto a carbon substrate.

The term "vaporous" or "gaseous" component is generally defined as the physical state of matter wherein the component, previously existing as a liquid or solid, is heated until evaporation occurs at a temperature below the critical temperature which can be condensed by the application of pressure.

The invention is directed to an adsorption powder suitable for removing metals and organic compounds from vaporous streams, the powder characterized as containing a carbon-based powder and an effective amount of cupric chloride suitable for removing metals from gaseous streams. Typically, the adsorption powder may be characterized as containing from about 1 to about 55 weight percent of carbon-based powder and from about 45 to about 1 weight percent of cupric chloride. Optionally, the powder may also contain calcium hydroxide, sulfur, potassium permanganate, potassium iodide, and combinations thereof.

In one general embodiment of the invention, the adsorption powder may contain carbon, calcium hydroxide, and an effective amount of cupric(II)chloride suitable for removing metals from gaseous streams. Generally the powder may contain from about 10 to about 60 weight percent of carbon, from about 10 to about 70 weight percent of calcium hydroxide, and from about 1 to about 45 weight percent of cupric(II)chloride. Typically, the powder may contain from about 30 to about 50 weight percent of carbon, from about 50 to about 70 weight percent of calcium hydroxide, and from about 2 to about 10 weight percent of cupric(II) chloride. In a more preferred embodiment of the invention, the powder will contain about 40 weight percent of carbon, about 60 weight percent of calcium hydroxide, and about 5 weight percent of cupric(II) chloride, based on a total of 105 weight percent.

In another embodiments of the invention, the adsorption powder may generally contain the components of carbon, calcium hydroxide, sulfur and an effective amount of cupric chloride for adsorbing gaseous metals. Generally, the powder may contain from about 30 to about 50 weight percent of carbon, from about 45 to about 70 weight percent of calcium hydroxide, from about 1 to about 10 weight percent of sulfur, and from about 1 to about 15 weight percent of cupric chloride. Typically, the powder may contain from about 35 to about 45 weight percent of carbon, from about 50 to about 65 weight percent of calcium hydroxide, from about 2 to about 8 weight percent of sulfur, and from about 4 to about 12 weight percent of cupric chloride. Preferable, the powder may contain about 38 weight percent of carbon, about 58 weight percent of calcium hydroxide, about 4 weight percent of sulfur, and from about 5 to about 10 weight percent of cupric chloride, based on the total weight percent of the powder.

In yet another embodiment of the invention, the adsorption powder may contain the components of carbon, calcium hydroxide, sulfur, potassium permanganate, and an effective amount of cupric chloride for adsorbing gaseous metals. Generally, the powder of this embodiment may contain from about 25 to about 45 weight percent of carbon, from about 40 to about 60 weight percent of calcium hydroxide, from about 2 to about 10 weight percent of sulfur, from about 5 to about 15 weight percent of potassium permanganate, and from about 1 to about 15 weight percent of cupric chloride. Typically, the powder may contain from about 30 to about 40 weight percent of carbon, from about 45 to about 55 weight percent of calcium hydroxide, from about 3 to about 8 weight percent of sulfur, from about 7 to about 12 weight percent potassium permanganate, and from about 2 to about 10 weight percent of cupric chloride. Preferable, the powder will contain about 34 weight percent of carbon, about 52 weight percent of calcium hydroxide, and about 10 weight percent of potassium permanganate, about 4 weight percent of sulfur, and about 5 weight percent of cupric chloride, based on a total of 105 weight percent.

In still another embodiment of the invention, the adsorption powder may contain the components of carbon, calcium hydroxide, potassium iodide impregnated onto a carbon substrate, and an effective amount of cupric chloride for adsorbing vaporous metals. Generally, the powder may contain from about 25 to about 45 weight percent of carbon, from about 45 to about 60 weight percent of calcium hydroxide, optionally from about 1 to about 15 weight percent of potassium iodide impregnated onto a carbon substrate, and from about 1 to about 10 weight percent of cupric chloride, wherein the carbon is carbon coal. Typically, the powder may contain from about 30 to about 40 weight percent of carbon, from about 50 to about 55 weight percent of calcium hydroxide, from about 5 to about 10 weight percent of potassium iodide impregnated onto a carbon substrate, and from about 5 to about 10 weight percent of cupric chloride.

In another embodiment of the invention, the adsorption powder may be characterized as containing potassium iodide impregnated onto a carbon substrate, calcium hydroxide, and cupric chloride. Generally, the powder may contain from about 10 to about 45 weight percent of potassium iodide impregnated onto a carbon substrate, from about 45 to about 55 weight percent of calcium hydroxide, and from about 1 to about 45 weight percent of cupric chloride. Preferred embodiments of the powder may contain about 38 weight percent of potassium iodide impregnated onto a carbon substrate, about 52 weight percent of calcium hydroxide, and about 10 weight percent of cupric chloride, and about 10 weight percent of potassium iodide impregnated onto a carbon substrate, about 45 weight percent of calcium hydroxide, and about 45 weight percent of cupric chloride.

In yet another embodiment of the invention, generally, the adsorption powder is characterized as containing potassium iodide ($KI_3$) impregnated onto carbon, activated carbon, calcium hydroxide, and cupric chloride. A general embodiment of this aspect of the invention may be characterized as containing from about 5 to about 15 weight percent of potassium iodide impregnated onto a carbon substrate, from about 25 to about 35 weight percent of activated carbon, from about 45 to about 55 weight percent of calcium hydroxide, and from about 1 to about 15 weight percent of cupric chloride. Preferably, the powder may contain from about 10 weight percent of potassium iodide impregnated onto a carbon substrate, about 30 weight percent of activated coal, about 52 weight percent of calcium hydroxide, and about 10 weight percent of cupric chloride.

In one preferred embodiment, the powder will contain about 35 weight percent of coal carbon, about 55 weight percent of calcium hydroxide, about 5 weight percent of potassium iodide impregnated onto a carbon substrate, and about 5 weight percent of cupric(II)chloride. In a second preferred embodiment, the powder will contain about 35 weight percent of coal carbon, about 50 weight percent of calcium hydroxide, about 10 weight percent of potassium iodide impregnated onto a carbon substrate, and about 5 weight percent of cupric(III)chloride. In yet a third preferred embodiment of the invention, the powder will contain about 35 weight percent of coal carbon, about 50 weight percent of calcium hydroxide, about 10 weight percent of potassium iodide impregnated onto a carbon substrate, and about 5 weight percent of cupric(IV)chloride. In still a fourth embodiment of this embodiment, the powder will contain about 10 weight percent of carbon impregnated with potassium iodide ($KI_3$), about 45 weight percent of calcium hydroxide, and about 45 weight percent of cupric chloride.

In any case, the adsorption powder must contain an effective amount of cupric chloride impregnated on or mixed with a carbon-containing powder, wherein the adsorption powder is suitable for removing mercury, other metals, as well as organic compounds from vaporous streams. In many instances, the efficiency of metals removal from the vaporous stream is enhanced by the addition of moisture thereto.

Many methods for making the adsorption powder of the present invention will become apparent to those skilled in the art. Particularly, the carbon-based powder can be impregnated by known methods. The methods of impregnating potassium iodide and potassium permanganate onto a carbon substrate are also well known in the art. Such methods are taught in U.S. Pat. No. 5,403,548 to Aibe et al, issued Apr. 4, 1995; U.S. Pat. No. 5,096,570 to Utz et al, issued Mar. 17, 1992; and U.S. Pat. No. 5,168,088 to Utz et al, issued Dec. 1, 1992 (incorporated herein by reference). The carbon-based powder of the invention can be prepared by many methods known in the art. Some of those methods are disclosed in U.S. Pat. Nos. 4,603,199; 5,212,144; 5,276,000; 5,292,708; 5,382,559; 5,444,031; and 5,614,459 (incorporated herein by reference).

Generally, the particle size distribution of the components of the powder may be characterized as 99% through a 100 mesh screen, 95% through a 200 mesh screen, and 90% through a 300 mesh screen.

High temperatures are necessary for effective removal of contaminants from soil. Temperatures of about 1800° F. are necessary to volatize organic compounds, metals and other impurities from a porous solid phase, such as contaminated soils, clays, and rock. It has been discovered that mercury trapped in contaminated soil is most efficiently adsorbed on carbon at a temperature of from about 300 to about 500° F. The most practical method of cooling a gaseous stream exiting an 1800° F. oven is to inject water into the gaseous stream. Water injection cools the gaseous stream to a temperature favorable for mercury removal, but also increases the moisture content of the porous solid phase, which decreases the efficiency of available mercury adsorption powders. While the metal adsorbing properties of many known adsorption powders experience decreased metal adsorption properties in a high moisture environment. The adsorption powder of the present invention operates most effectively in higher moisture environment.

Experimentation with several carbon sources revealed that coal carbon, in many instances, is preferable over wood carbon for metals adsorption depending upon the adsorption conditions. Many prior art adsorption powders use wood carbon as the carbon component, rather than coal carbon.

Cupric chloride, wherein the copper exhibits a valence from +2 to +4, has been observed to provide significant enhances the adsorption of metals when combined with a carbon-based powder, particularly mercury, from a gaseous or vaporous streams containing the vaporized metal. It is believed that cupric chloride supplies chlorine and activated copper to the elemental metals in the exhaust stream, wherein elemental metal will reacts with chlorine to form metal chlorides, and the activated copper will form a stable metal amalgam. Both forms of metals are easily captured from the exhaust gaseous stream. $KI_3$ impregnated carbon was also found to increase mercury adsorption when it was included in the powder.

Figure 1:
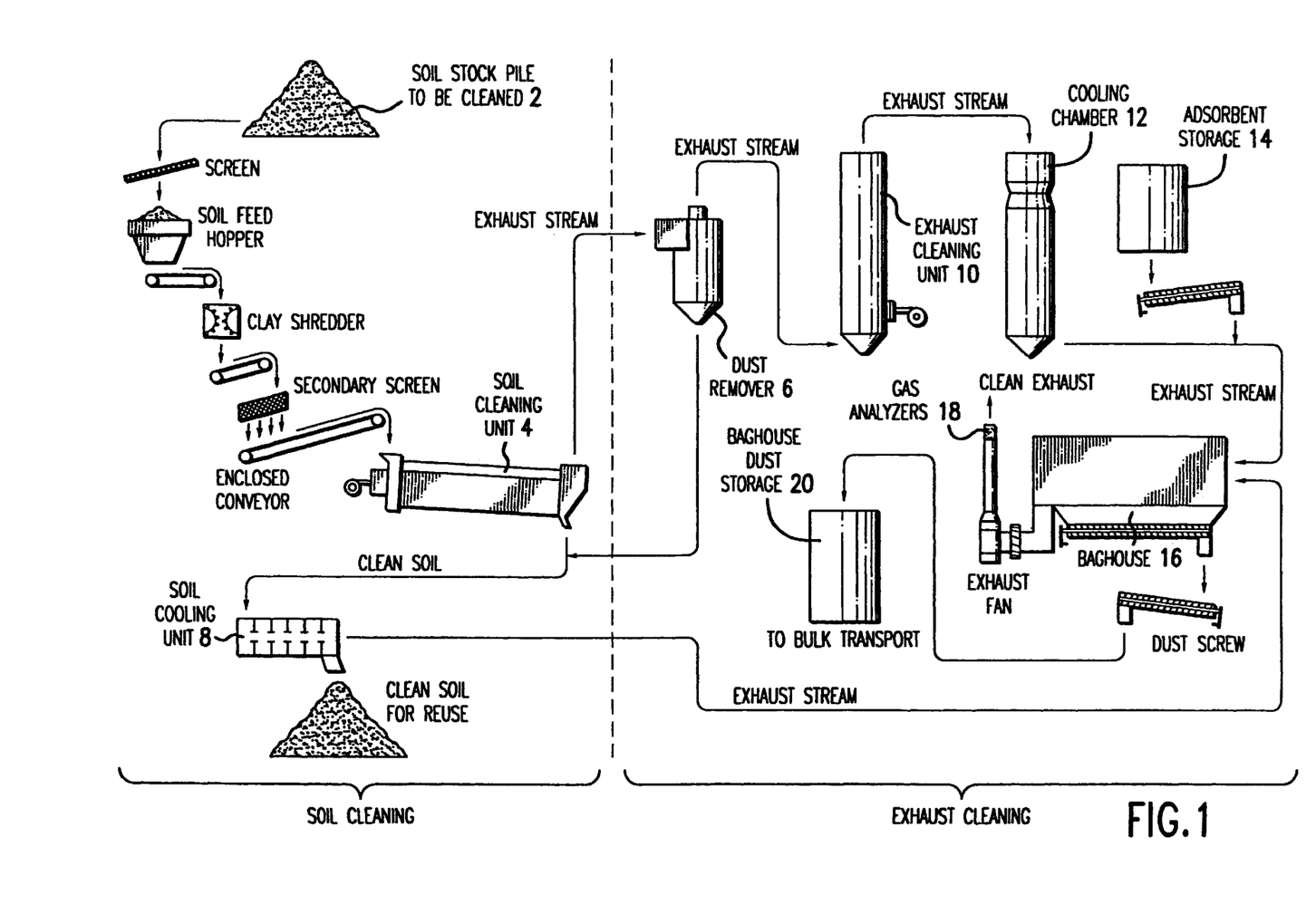
FIG. 1 is a schematic view in elevation illustrating the design of an LTTD facility in which the novel adsorption powder and method used to remove mercury and organic compounds from gaseous streams.

According to FIG. 1, there is illustrated a schematic diagram of one method of the present invention. In one embodiment of the invention, the solid phase, in this instance, contaminated soil containing mercury and organic compounds, is processed at atmospheric pressure to remove the mercury and organic compounds therefrom. Mercury- and organic compound-contaminated soil 2 is fed to a hopper for prescreened to remove clay, large stones, etc. Afterwards, the screened soil and is transferred to cleaning unit 4. Typically, cleaning unit 4 is a rotary kiln. In the kiln, the mercury- and organic compound-contaminated soil is heated to completely volatize the mercury and organic compounds from the soil (e.g. to a temperature of about 900° F.). The heating process generates gaseous and solid components. The solid component will be free of any mercury and organic compounds, and the gaseous component will contain all the mercury and organic compounds. The gaseous component is transferred from cleaning unit 4 to dust remover 6, while the mercury- and organic compound-free, solid component (i.e. soil) is transferred to cooling unit 8, wherein it is cooled to temperatures approaching that of the atmosphere and prepared for reuse.

Dust remover 6, typically a multi-tube dust collector or filter system, separates and removes any particulate matter from the mercury- and organic compound-containing, gaseous component and recycles it to cooling unit 8. The gaseous component of dust remover 8 is transferred to exhaust cleaning unit 10. Exhaust cleaning unit 10 further heats the mercury- and organic compound-containing gaseous component to a temperature of about 1800° F. for about two seconds to combust any organic compounds in the material to elemental oxides. From exhaust cleaning unit 10, the gaseous component is then transferred through cooling chamber 12, wherein a water pump (not shown) injects water into cooling chamber 12 to reduce the temperature of the soil to about 360 to 400° F. The water is directly injected into the gaseous stream at a rate of about 40 to 50 gallons per minute. The powder formulated to capture mercury and treat HCl is injected into the gaseous stream at a rate of about 200 lbs. per hour. The cooling process consequentially increases the moisture content of the mercury-gaseous component from about 2 weight percent moisture up to the saturation point at operating temperatures.

The high temperature, high moisture gaseous component is then contacted with the adsorption powder of the invention. Typically, the adsorption powder is stored in silo 14 and injected into the gaseous component. The powder is effective in removing metals, particularly mercury, and other heavy metal contaminants previously recited. The mercury vapor is believed to be adsorbed into he pores of the powder.

After the gaseous component has been contacted with the adsorption powder to produce a powder/gaseous component containing the mercury, the powder/gaseous component is transferred to baghouse 16. The carbon component of the mercury-containing adsorption powder accumulates on the walls of the bag of baghouse 16 that act as a particulate filter for the mercury-containing adsorption powder. The powder is trapped in the bag, while the mercury-free, gaseous component is filtered through the bag and exhausted as flue gases at stack 18. Baghouse 16 collects the mercury-containing, particulate fraction of the adsorption powder. The mercury-containing, particulate fraction of the adsorption powder is transferred via a dust screw to a dust storage facility 20 for subsequent removal and regeneration/disposal processes known to those skilled in the art. Any remaining mercury-free, dust particulate fraction in the clean soil transferred to cooling unit 8 is recycled to baghouse 16.

While the reaction mechanism of the adsorption powder is not completely understood, it is believed that on such mechanism for adsorption of the metal component, e.g. mercury, reacts with a cupric(II) chloride-containing powder is as follows:

$$CuCl_2 + 2Hg \rightarrow HgCl_2 + CuHg$$

$$CuCl_2 + 2Hg \rightarrow HgCl_2 + Cu$$

$$Hg + 0.5O_2 \rightarrow HgO$$

$$HgO + CuCl_2 \rightarrow HgCl_2 + CuO$$

$$CuCl_2 + 0.5O_2 \rightarrow Cl_2 + CuO$$

$$Hg + Cl_2 \rightarrow HgCl_2$$

$$2Hg + Cl_2 \rightarrow Hg_2Cl_2$$

$$Hg_2Cl_2 \rightarrow Hg + HgCl_2$$

$$Cu + Hg(II) \rightarrow Hg + Cu(II)$$

Cupric chloride is unstable at high temperatures (e.g. >160° F.) and decomposes. However, ferrous chloride boils at a temperature of about 315° C., and zinc chloride boils at about 732° C., while calcium chloride boils at a temperature of about 1600° C. and cuprous chloride boils at about 1366° C.

A series of bench scale experiments were performed using adsorption powders of the invention to measure the efficiency of metal removal for a solid phase material utilizing the method illustrated in FIG. 1 and described herein above. The examples provided below are for illustrative purposes only and in no way provide the only means of utilizing the adsorption powder of the invention. Those skilled in the art will readily know other methods of utilizing the adsorption powder to remove and reduce metals and organic compounds from solid phase materials.

EXAMPLE 1

Two different solid phase samples of soils were utilized to determine the effectiveness of the adsorption powder and method of the invention. The first soil (soil A) contained about 4 parts per million (ppm) of mercury, and the second soil (soil B) contained about 14 ppm of mercury. Each sample was screened to 1-inch utilizing the appropriate mesh screen. The coarse material (above 1-inch average diameter) were removed from the samples and discarded. Portions of the samples passing through the 1-inch screen were divided into several 1 kg charges. Each charge was homogenized to assure equal distribution of mercury within the soil matrix as well as to eliminate any "hot spots" therein. The homogenized samples were inserted into glass tubes that were heated to a temperature of about 900° F. using an indirect, electrically, heating oven. During the heating process, the glass tubes were continuously rotated inside the oven to closely resemble a rotary kiln of an LTTD unit. Generally, after about 10 minutes of heating, the tubes reached 900° F., and the heating process was stopped.

While heating the soil, a gas exhibiting an analysis of 10 volume percent of oxygen, 3.2 volume percent of carbon dioxide, 100 ppm of $NO_x$, 11 ppm of $SO_2$, and the balance nitrogen was continuously injected into the glass tubes at a rate of about 70 cm³/second to produce an oven off-gas. The oven-off gas was heated to a temperature of about 1800° F. by passing it through a high temperature oven (i.e. thermal oxidizer), and afterwards water was injected into the gaseous stream to cool the gas to a temperature of about 400° F. and produce a high moisture gaseous stream (i.e. moisture content of from about 3% to saturation at any temperature). The high moisture content gas was passed through fixed beds containing several different adsorption powders to capture the mercury. Next, the high moisture content gas was bubbled through a potassium permanganate solution fixed in an ice bath. Any mercury not adsorbed by the adsorption powder is oxidized and collected in the potassium permanganate solution. At the end of each experimental run, the soil sample, adsorption powder and potassium permanganate solution were collected and analyzed for total mercury content, and material balances were performed to calculate the percentage of mercury recovered from the soil sample.

The method of analyses for total mercury content in the soil were EPA SW 846, Method 747, and for mercury in flue gases EPA Method 29.

Table 1 provides the composition of an adsorption powder containing carbon and calcium hydroxide components in the listed percentages utilized in the process for Run No. 1. In Run Nos. 2 through 4, 5 weight percent of cupric(II)chloride was added to the powder composition. The amount of mercury contained in the soil sample before and after treatment, mercury capture efficiency, mercury material balance to determine the percent of recovery, operating process temperature, and moisture content are presented in the table.

TABLE 1

| Run # | Adsorbent Powder Components | Hg In, mg | Hg Out, mg | Effc % | Mass Bal, % | Temp, ° F. | Water, wt % |
|---|---|---|---|---|---|---|---|
| 1 | 40%C + 60%Ca(OH)$_2$ | 2.8 | 1 | 64.3 | 95 | 400 | 0.50 |
| 2 | 40%C + 60%Ca(OH)$_2$ + 5%CuCl$_2$ | 1.8 | 0.06 | 96.67 | 108 | 400 | 0.50 |
| 3 | 40%C + 60%Ca(OH)$_2$ + 5%CuCl$_2$ | 2.73 | 0.2 | 92.67 | 81 | 400 | 0.50 |
| 4 | 40%C + 60%Ca(OH)$_2$ + 5%CuCl$_2$ | 9.66* | 0.6 | 94.0 | 79 | 400 | 0.50 |

EXAMPLE 2

Table 2 provides a carbon-based, adsorption powder, Sorbalite, containing carbon, calcium hydroxide and sulfur components in the listed percentages utilized in the process for Run Nos. 1 through 3. In Run Nos. 4 through 15, 1 to 10 weight % of cupric(II)chloride, based on a total of 100 weight percent of the Sorbalite, was added to the powder composition.

TABLE 2

| Run # | Adsorbent Powder Components | Hg In, mg | Hg Out, mg | Effc % | Mass Bal, % | Temp, ° F. | Water, wt % |
|---|---|---|---|---|---|---|---|
| 1 | 38%C + 58%Ca(OH)$_2$ + 4%S | 3.5 | 0.822 | 76.51 | 93 | 300 | 0.01 |
| 2 | 38%C + 58%Ca(OH)$_2$ + 4%S | 3.6 | 1.2 | 66.67 | 57 | 300 | 0.01 |
| 3 | 38%C + 58%Ca(OH)$_2$ + 4%S | 2.7 | 0.9 | 66.67 | 84 | 400 | 0.50 |
| 4 | [38%C + 58%Ca(OH)$_2$ + 4%S] + 3%CuCl$_2$ | 1.4 | 0.65 | 93.57 | 219 | 400 | 0.50 |
| 5 | [38%C + 58%Ca(OH)$_2$ + 4%S] + 1%CuCl$_2$ | 2.02* | 0.301 | 85.00 | 101 | 400 | 0.50 |
| 6 | [38%C + 58%Ca(OH)$_2$ + 4%S] + 5%CuCl$_2$ | 2.46 | 0.087 | 96.46 | 83.90 | 300 | 0.01 |
| 7 | [38%C + 58%Ca(OH)$_2$ + 4%S] + 5%CuCl$_2$ | 1.84 | 0.009 | 99.51 | 96 | 300 | 0.01 |
| 8 | [38%C + 58%Ca(OH)$_2$ + 4%S] + 5%CuCl$_2$ | 1.75 | 0.014 | 99.20 | 86 | 300 | 0.01 |
| 9 | [38%C + 58%Ca(OH)$_2$ + 4%S] + 5%CuCl$_2$ | 1.94 | 0.067 | 96.55 | 103 | 300 | 0.01 |
| 10 | [38%C + 58%Ca(OH)$_2$ + 4%S] + 5%CuCl$_2$ | 2.21 | 0.06 | 97.29 | 56 | 300 | 0.01 |
| 11 | [38%C + 58%Ca(OH)$_2$ + 4%S] + 5%CuCl$_2$ | 1.844 | 0.057 | 96.91 | 98 | 400 | 0.01 |
| 12 | [38%C + 58%Ca(OH)$_2$ + 4%S] + 5%CuCl$_2$ | 1.932 | 0.06 | 96.89 | 81 | 400 | 0.01 |
| 13 | [38%C + 58%Ca(OH)$_2$ + 4%S] + 5%CuCl$_2$ | 2.4 | 0.02 | 99.17 | 91 | 300 | 0.01 |
| 14 | [38%C + 58%Ca(OH)$_2$ + 4%S] + 10%CuCl$_2$ | 2.5 | 0.05 | 98.00 | 61 | 300 | 0.01 |
| 15 | [38%C + 58%Ca(OH)$_2$ + 4%S] + 10%CuCl$_2$ | 2.65 | 0.18 | 93.21 | 96 | 400 | 0.50 |

EXAMPLE 3

Table 3 provides the composition of an adsorption powder containing carbon, calcium hydroxide and potassium permanganate components in the listed percentages utilized in the process for Run Nos. 1 through 3. In Run Nos. 4 and 5, 5 weight % of cupric(II)chloride, based on 100 total weight percent of the carbon-based powder, was added to the powder composition.

TABLE 3

| Run # | Adsorbent Powder Components | Hg In, mg | Hg Out, mg | Effc % | Mass Bal, % | Temp °F. | Water wt % |
|---|---|---|---|---|---|---|---|
| 1 | 34%C + 52%Ca(OH)$_2$ + 4%S + 10%KMnO$_4$ | 2.04 | 0.38 | 81.34 | 65 | 300 | 0.01 |
| 2 | 34%C + 52%Ca(OH)$_2$ + 4%S + 10%KMnO$_4$ | 1.92 | 0.439 | 77.14 | 92 | 400 | 0.50 |
| 3 | 34%C + 52%Ca(OH)$_2$ + 4%S + 10%KMnO$_4$ | 1.85 | 0.33 | 82.16 | 104 | 300 | 0.01 |
| 4 | [34%C + 52%Ca(OH)$_2$ + 4%S + 10%KMnO$_4$] + 5%CuCl$_2$ | 2.4 | 0.02 | 99.17 | 90 | 300 | 0.01 |
| 5 | [34%C + 52%Ca(OH)$_2$ + 4%S + 10%KMnO$_4$] + 5%CuCl$_2$ | 2.9 | 0.19 | 93.45 | 119 | 400 | 0.50 |

EXAMPLE 4

Table 4 provides the composition of an adsorption powder containing potassium iodide impregnated onto a carbon substrate, calcium hydroxide and carbon coal components. Run No. 1 provides a comparative example of an adsorption powder containing potassium iodide impregnated onto carbon coal and calcium hydroxide. Run No. 2 provides a comparative example of a powder containing potassium iodide impregnated onto carbon, calcium hydroxide, and carbon coal. Run Nos. 3 through 5 provide the powder of Run No. 2 with the addition of cupric(II)chloride, cupric (III)chloride and cupric(IV)chloride. Run Nos. 6 and 7 provide powders containing potassium iodide impregnated onto a carbon substrate, calcium hydroxide and cupric(II) chloride.

TABLE 4

| Run # | Adsorbent Powder Components | Hg In, mg | Hg Out, mg | Effc % | Mass Bal, % | Temp °F. | Water wt % |
|---|---|---|---|---|---|---|---|
| 1 | 38%Coal Carbon w/KI$_3$ + 62%Ca(OH)$_2$ | 2.2 | 0.68 | 69.09 | 122 | 400 | 0.50 |
| 2 | 5%Carbon w/KI$_3$ + 60%Ca(OH)$_2$ + 35%Coal Carbon | 4 | 0.7 | 82.50 | 93 | 400 | 0.50 |
| 3 | 5%Carbon w/KI$_3$ + 55%Ca(OH)$_2$ + 35%Coal Carbon + 5%CuCl$_2$ | 5.03 | 0.117 | 97.67 | 108 | 400 | 0.50 |
| 4 | 10%Carbon w/KI$_3$ + 50%Ca(OH)$_2$ + 35%Coal Carbon + 5%CuCl$_3$ | 5.54 | 0.197 | 96.44 | 113 | 400 | 0.50 |
| 5 | 10%Carbon w/KI$_3$ + 50%Ca(OH)$_2$ + 35%Coal Carbon + 5%CuCl$_4$ | 4.4 | 0.178 | 95.95 | 98 | 400 | 0.50 |
| 6 | 38%Carbon w/KI$_3$ + 52%Ca(OH)$_2$ + 10%CuCl$_2$ | 4.48 | 0.011 | 99.77 | nd[1] | 400 | 0.50 |
| 7 | 38%Carbon w/KI$_3$ + 52%Ca(OH)$_2$ + 10%CuCl$_2$ | 4.66 | 0.042 | 99.10 | 103 | 400 | 0.50 |
| 8 | 10%Carbon w/KI$_3$ + 30%activated carbon + 10%CuCl$_2$ + 50%Ca(OH)$_2$ | 1.492 | 0.023 | 93.1 | 96 | 400 | 0.50 |
| 9 | 10%Carbon w/KI$_3$ + 45%CuCl$_2$ + 45% Ca(OH)$_2$ | 1.486 | 0.007 | 94.5 | 10 | 400 | 0.51 |

[1]nd: no data available

What is claimed is:

1. A process for removing metals and organic compounds from gaseous streams using an adsorption powder, the adsorption powder characterized as containing a carbon-based powder and an effective amount of cupric chloride suitable for removing metals and organic compounds from vaporous streams, wherein the method comprises the steps of:

a) placing a solid phase metals-containing and organic compounds-containing material into a cleaner;

b) heating the cleaner containing the solid phase material to form gaseous and solid components of the material, wherein the metals are vaporized and contained in the gaseous component and the organic compounds are reduced to elemental gases;

c) transferring the gaseous component to an exhaust cleaning unit/afterburner, and transferring the solid component, to a cooling unit;

d) heating the exhaust cleaning unit/afterburner containing the gaseous component to combust the organic compounds to elemental oxides;

e) cooling the exhaust cleaning unit/afterburner containing the gaseous component;

f) adding the adsorption powder to the exhaust cleaning unit/afterburner to adsorb the metals and provide a metals-free gaseous component, wherein a gaseous component containing adsorption powder is produced;

g) transferring the gaseous component-containing adsorption powder to a baghouse; and h) releasing the metals-free gaseous component to the atmosphere, wherein the metals are selected from the group consisting of mercury, lead, nickel, zinc, copper, arsenic and cadmium, and the organic compounds are selected from the group consisting of dioxins and furans.

2. The method according to claim 1, wherein the adsorption powder of step f) is a carbon-based powder selected from the group consisting of coal carbons, wood carbon, activated carbon, fruit pits, graphite carbon, coconut shell carbon, peat carbons, petroleum cokes, synthetic polymers, and combinations thereof.

3. The method according to claim 2, wherein the effective amount of cupric chloride is from about 1 to about 45 weight percent.

4. The method according to claim 3, wherein the cupric chloride is selected from the group consisting of cupric(II)chloride, cupric(III)chloride, and cupric(IV)chloride.

5. The method according to claim 4, wherein the adsorption powder further comprises one or more components selected from the group consisting of calcium hydroxide, sulfur, potassium permanganate, and potassium iodide.

6. The method according to claim 5, wherein the adsorption powder comprises from about 10 to about 60 weight percent of carbon, from about 10 to about 70 weight percent of calcium hydroxide, and from about 1 to about 45 weight percent of cupric(II)chloride.

7. The method according to claim 6, wherein the adsorption powder comprises from about 30 to about 50 weight percent of carbon, from about 50 to about 70 weight percent of calcium hydroxide, and from about 2 to about 10 weight percent of cupric(II)chloride.

8. The method according to claim 7, wherein the adsorption powder comprises about 40 weight percent of carbon, about 60 weight percent of calcium hydroxide, and about 5 weight percent of cupric(II)chloride, based on a total of weight percent of 105.

9. The method according to claim 5, wherein the adsorption powder comprises from about 30 to about 50 weight percent of carbon, from about 45 to about 70 weight percent of calcium hydroxide, from about 1 to about 10 weight percent of sulfur, and from about 1 to about 15 weight percent of cupric(II)chloride.

10. The method according to claim 9, wherein the adsorption powder comprises from about 35 to about 45 weight percent of carbon, from about 50 to about 65 weight percent of calcium hydroxide, from about 2 to about 8 weight percent of sulfur, and from about 4 to about 12 weight percent of cupric(II)chloride.

11. The method according to claim 10, wherein the adsorption powder comprises about 38 weight percent of carbon, about 58 weight percent of calcium hydroxide, about 4 weight percent of sulfur, and from about 5 to about 10 weight percent of cupric(II)chloride, based on a total of weight percent of 110.

12. The method according to claim 5, wherein the adsorption powder comprises from about 25 to about 45 weight percent of carbon, from about 40 to about 60 weight percent of calcium hydroxide, from about 2 to about 10 weight percent of sulfur, from about 5 to about 15 weight percent of potassium permanganate impregnated onto a carbon substrate, and from about 1 to about 15 weight percent of cupric(II)chloride.

13. The method according to claim 12, wherein the adsorption powder comprises from about 30 to about 40 weight percent of carbon, from about 45 to about 55 weight percent of calcium hydroxide, from about 3 to about 8 weight percent of sulfur, from about 7 to about 12 weight percent of potassium permanganate impregnated onto a carbon substrate, and from about 2 to about 10 weight percent of cupric(II)chloride.

14. The method according to claim 13, wherein the adsorption powder comprises about 45 weight percent of carbon, about 52 weight percent of calcium hydroxide, about 4 weight percent of sulfur, about 10 weight percent of potassium permanganate impregnated onto a carbon substrate, and about 5 weight percent of cupric(II)chloride, based on a total of weight percent of 106.

15. The method according to claim 5, wherein the adsorption powder comprises from about 25 to about 45 weight percent of carbon, from about 45 to about 60 weight percent of calcium hydroxide, from about 5 to about 50 weight percent of potassium iodide impregnated on to a carbon substrate, and from about 5 to about 45 weight percent of cupric(II)chloride.

16. The method according to claim 15, wherein the adsorption powder comprises from about 35 to about 40 weight percent of carbon, from about 50 to about 55 weight percent of calcium hydroxide, from about 10 to about 35 weight percent of potassium iodide impregnated on to a carbon substrate, and from about 8 to about 15 weight percent of cupric(II)chloride.

17. The method according to claim 16, wherein the adsorption powder comprises about 38 weight percent of carbon, about 52 weight percent of calcium hydroxide, about 10 weight percent of potassium iodide impregnated on to a carbon substrate, and about 10 weight percent of cupric(II) chloride, based on a total weight percent of 110.

18. The method according to claim 5, wherein the adsorption powder comprises from about 25 to about 45 weight percent of carbon, from about 40 to about 60 weight percent of calcium hydroxide, from about 2 to about 15 weight percent of potassium iodide impregnated onto a carbon substrate, and from about 1 to about 15 weight percent of cupric chloride.

19. The method according to claim 18, wherein the adsorption powder comprises from about 30 to about 40 weight percent of carbon, from about 40 to about 60 weight percent of calcium hydroxide, from about 2 to about 12 weight percent of potassium iodide impregnated onto a carbon substrate, and from about 1 to about 15 weight percent of cupric chloride.

20. The method according to claim 19, wherein the adsorption powder comprises about 35 weight percent of carbon, about 55 weight percent of calcium hydroxide, about 5 of potassium iodide impregnated onto a carbon substrate, and about 5 weight percent of cupric(II)chloride.

21. The method according to claim 19, wherein the adsorption powder comprises about 35 weight percent of carbon, about 50 weight percent of calcium hydroxide, about 10 of potassium iodide impregnated onto a carbon substrate, and about 5 weight percent of cupric(III)chloride.

22. The method according to claim 19, wherein the adsorption powder comprises about 35 weight percent of carbon, about 50 weight percent of calcium hydroxide, about 10 of potassium iodide impregnated onto a carbon substrate, and about 5 weight percent of cupric(IV)chloride.

23. A method of removing metals and organic compounds from a gaseous stream using an adsorption powder wherein the adsorption powder, comprises from about 30 to about 40 weight percent of carbon, from about 40 to about 60 weight percent of calcium hydroxide, from about 1 to about 10 weight percent of sulfur, from about 5 to about 15 weight percent of potassium permanganate, and from about 1 to about 15 weight percent of cupric(II)chloride, wherein the method comprises the steps of:

a) placing a stolid phase metals-containing and organic compounds-containing material into a rotary kiln/drum;

b) heating the kiln/drum containing the solid phase material to a temperature of from about 325° to about 900° F. to form gaseous and solid components of the material, wherein the metals are vaporized and contained in the gaseous component and the organic compounds are reduced to elemental gases;

c) transferring the gaseous component to an exhaust cleaning unit/afterburner, and transferring the solid component to a cooling unit;

d) heating the exhaust cleaning unit/afterburner containing the gaseous component to combust the organic compounds to elemental oxides;

e) cooling the exhaust cleaning unit/afterburner containing the gaseous component;

f) adding the adsorption powder to the exhaust cleaning unit/afterburner to adsorb the metals and provide a metals-free gaseous component, wherein a gaseous component-containing adsorption powder is produced;

g) transferring the gaseous component-containing adsorption powder to a baghouse; and h) releasing the metals-free gaseous component of to the atmosphere, wherein the metals are selected from the group consisting of mercury, lead, nickel, zinc, copper, arsenic and cadmium, and the organic compounds are selected from the group consisting of dioxins and furans.

24. A method of removing mercury and organic compounds from a gaseous stream using an adsorption powder, wherein the adsorption powder comprises from about 25 to about 45 weight percent of carbon, from about 45 to about 60 weight percent of calcium hydroxide, from about 30 to about 50 weight percent of potassium iodide impregnated on to a carbon substrate, and from about 5 to about 15 weight percent of cupric(II)chloride, wherein the method comprises the steps of:

a) placing a solid phase mercury- and organic compounds-containing material into a rotary kiln/drum;

b) heating the kiln/drum containing the solid phase material to a temperature of from about 325° to about 900° F. to form gaseous and solid components of the material, wherein the mercury is vaporized and contained in the gaseous component and the organic compounds are reduced to elemental gases;

c) transferring the gaseous component to an exhaust cleaning unit/afterburner, and transferring the solid component to a cooling unit;

d) heating the exhaust cleaning unit/afterburner containing the gaseous component to combust the organic compounds to elemental oxides;

e) cooling the exhaust cleaning unit/afterburner containing the gaseous component;

f) adding the adsorption powder to the exhaust cleaning unit/afterburner to adsorb the mercury and provide a mercury-free gaseous component, wherein a gaseous component-containing adsorption powder is produced;

g) transferring the gaseous component-containing adsorption powder to a baghouse; and h) releasing the mercury-free gaseous component to the atmosphere, wherein the organic compounds are selected from the group consisting of dioxins and furans.

25. A method of removing metals and organic compounds from a gaseous stream using an adsorption powder, wherein the adsorption powder comprises from about 25 to about 45 weight percent of carbon, from about 40 to about 60 weight percent of calcium hydroxide, from about 2 to about 15 weight percent of potassium iodide impregnated onto a carbon substrate, and from about 1 to about 15 weight percent of cupric chloride, wherein the method comprises the steps of:

a) placing a solid phase metals-containing and organic compounds-containing material into a rotary kiln/drum;

b) heating the kiln/drum containing the solid phase material to a temperature of from about 325° to about 900° F. to form gaseous and solid components of the material, wherein the metals are vaporized and contained in the gaseous component and the organic compounds are reduced to elemental gases;

c) transferring the gaseous component to an exhaust cleaning unit/afterburner, and transferring the solid component to a cooling unit;

e) cooling the exhaust cleaning unit/afterburner containing the gaseous component;

f) adding the adsorption powder to the exhaust cleaning unit/afterburner to adsorb the metals and provide a metals-free gaseous component, wherein a gaseous component-containing adsorption powder is produced;

g) transferring the gaseous component-containing adsorption powder to a baghouse; and h) releasing the metals-free gaseous component to the atmosphere, wherein the metals are selected from the group consisting of mercury, lead, nickel, zinc, copper, arsenic and cadmium, and the organic compounds are selected from the group consisting of dioxins and furans.

26. A method of removing metals and organic compounds from a gaseous stream using an adsorption powder, wherein the adsorption powder comprises about 35 weight percent of carbon, about 55 weight percent of calcium hydroxide, about 5 of potassium iodide impregnated onto a carbon substrate, and about 5 weight percent of cupric(II)chloride, wherein the method comprises the steps of:

a) placing a solid phase metals- and organic compounds-containing material into a rotary kiln/drum;

b) heating the kiln/drum containing the solid phase material to a temperature of from about 325° to about 900° F. to form gaseous and solid components of the material, wherein the metals are vaporized and contained in the gaseous component and the organic compounds are reduced to elemental gases;

c) transferring the gaseous component to an exhaust cleaning unit/afterburner, and transferring the solid component to a cooling unit;

d) heating the exhaust cleaning unit/afterburner containing the gaseous component to combust the organic compounds to elemental oxides;

e) cooling the exhaust cleaning unit/afterburner containing the gaseous component;

f) adding the adsorption powder to the exhaust cleaning unit/afterburner to adsorb the metals and provide a metals-free gaseous component, wherein a gaseous component-containing adsorption powder is produced;

g) transferring the gaseous component-containing adsorption powder to a baghouse; and h) releasing the metals-free gaseous component to the atmosphere, wherein the metals are selected from the group consisting of mercury, lead, nickel, zinc, copper, arsenic and cadmium, and the organic compounds are selected from the group consisting of dioxins and furans.

27. A method of removing metals and organic compounds from a gaseous stream using an adsorption powder, wherein the adsorption powder comprises about 35 weight percent of carbon, about 50 weight percent of calcium hydroxide, about 10 of potassium iodide impregnated onto a carbon substrate, and about 5 weight percent of cupric(III)chloride, wherein the method comprises the steps of:

a) placing a solid phase metals-containing, and organic compounds-containing material into a rotary kiln/drum;
 b) heating the kiln/drum containing the solid phase material to a temperature of from about 325° to about 900° F. to form gaseous and solid components of the material, wherein the metals are vaporized and contained in the gaseous component and the organic compounds are reduced to elemental gases;
 c) transferring the gaseous component to an exhaust cleaning unit/afterburner, and transferring the solid component to a cooling unit;
 d) heating the exhaust cleaning unit/afterburner containing the gaseous component to combust the organic compounds to elemental oxides;
 e) cooling the exhaust cleaning unit/afterburner containing the gaseous component;
 f) adding the adsorption powder to the exhaust cleaning unit/afterburner to adsorb the metals and provide a metals-free gaseous component, wherein a gaseous component-containing adsorption powder is produced;
 g) transferring the gaseous component-containing adsorption powder to a baghouse; and
 h) releasing the metals-free gaseous component to the atmosphere, wherein the metals are selected from the group consisting of mercury, lead, nickel, zinc, copper, arsenic and cadmium, and the organic compounds are selected from the group consisting of dioxins and furans.

28. A method of removing metals and organic compounds from a gaseous stream using an adsorption powder, wherein the adsorption powder comprises about 35 weight percent of carbon, about 50 weight percent of calcium hydroxide, about 10 of potassium iodide impregnated onto a carbon substrate, and about 5 weight percent of cupric(IV)chloride, wherein the method comprises the steps of:

a) placing a solid phase metals-containing and organic compounds-containing material into a rotary kiln/drum;
 b) heating the kiln/drum containing the solid phase material to a temperature of from about 325° to about 900° F. to form gaseous and solid components of the material, wherein the metals are vaporized and contained in the gaseous component and the organic compounds are reduced to elemental gases;
 c) transferring the gaseous component to an exhaust cleaning unit/afterburner, and transferring the solid component to a cooling unit;
 d) heating the exhaust cleaning unit/afterburner containing the gaseous component to combust the organic compounds to elemental oxides;
 e) cooling the exhaust cleaning unit/afterburner containing the gaseous component;
 f) adding the adsorption powder to the exhaust cleaning unit/afterburner to adsorb the metals and provide a metals-free gaseous component, wherein a gaseous component-containing adsorption powder is produced;
 g) transferring the gaseous component-containing adsorption powder to a baghouse; and
 h) releasing the metals-free gaseous component to the atmosphere, wherein the metals are selected from the group consisting of mercury, lead, nickel, zinc and cadmium, and the organic compounds are selected from the group consisting of dioxins and furans.

* * * * *

UNITED STATES PATENT AND TRADEMARK OFFICE
CERTIFICATE OF CORRECTION

PATENT NO. : 6,558,642 B2
DATED : May 6, 2003
INVENTOR(S) : Youssef El-Shoubary and Ruby Maes It is certified that error appears in the above-identified patent and that said Letters Patent is hereby corrected as shown below:

<u>Column 14,</u>
Line 65, after "a" delete "stolid" and insert therefore -- solid --.

Signed and Sealed this

Twenty-third Day of September, 2003

JAMES E. ROGAN
*Director of the United States Patent and Trademark Office*